United States Patent [19]
Baker, Jr.

[11] Patent Number: 6,058,956
[45] Date of Patent: May 9, 2000

[54] CYCLING SELF CHECKING BLOCK VALVE

[76] Inventor: G. Paul Baker, Jr., 1018 Laurel Ave., Denham Springs, La. 70726

[21] Appl. No.: 09/139,473

[22] Filed: Aug. 25, 1998

Related U.S. Application Data

[60] Provisional application No. 60/056,944, Aug. 25, 1997.
[51] Int. Cl.[7] .................................................. F16K 21/00
[52] U.S. Cl. .................. 137/1; 137/624.13; 137/624.18; 137/601
[58] Field of Search ......................... 137/624.13, 625.28, 137/625.33, 625.3, 601, 599, 624.18, 624.2, 624.11, 1, 624.15

[56] References Cited

U.S. PATENT DOCUMENTS

| | | | |
|---|---|---|---|
| 4,609,011 | 9/1986 | Uehara | 137/601 X |
| 4,612,845 | 9/1986 | Burkel et al. | 137/624.2 X |
| 4,987,917 | 1/1991 | Kah, Jr. | 137/624.2 X |
| 5,879,137 | 3/1999 | Yie | 137/624.13 X |

*Primary Examiner*—Kevin Lee
*Attorney, Agent, or Firm*—Phelps Dunbar, L.L.P.

[57] ABSTRACT

Cycling, self-checking block valve system that continuously cycles such that the user of the block valve system can determine if the system is operational at all times. A dual port block valve body contains two block valves which alternate between open and closed. The open and closing cycle is monitored for any changes, and the operator is alerted if one of the valves is not operating properly.

15 Claims, 2 Drawing Sheets

CYCLING SELF CHECKING BLOCK VALVE

This application claims the benefit of U.S. Provisional Application No. 60/056,944 filed Aug. 25, 1997.

BACKGROUND OF THE INVENTION

This invention relates in general to valves utilized as part of an emergency shut down system in industrial processes, and in particular to a dual port block valve system that continuously cycles two valves between the open and closed positions, and enables the operator to know if there is a problem with operation of the valve prior to its needed use in an emergency shutdown.

Industrial operations often include block valves that are utilized as part of an emergency shut down system. One of the problems with these valves is the infrequency of their use, which may result in a "frozen" valve, at the critical moment when it is needed. However, frequent testing of the valve in insure that it is not frozen, or in some manner not working properly is usually not an option, due to the disruptions of the process caused by operating block valves in process lines.

SUMMARY OF THE INVENTION

The instant invention provides for a valve arrangement with two ports that each contain a block valve, that cycle between open and closed. In addition, the valve system recognizes if one of the valves ceases to function properly, thus providing opportunity for the valve to be promptly repaired. This system avoids the problem of unknown frozen or otherwise non-functional valves in emergency shut down systems. While the present invention does not fully resolve the problem of valve component failure, it does promptly alert the operator to the problem with the valve.

BRIEF DESCRIPTION OF THE DRAWINGS

Reference will be made to the drawings wherein like parts are designated by like numerals and wherein.

DETAILED DESCRIPTION OF THE PREFERRED EMBODIMENT

Figure 1:
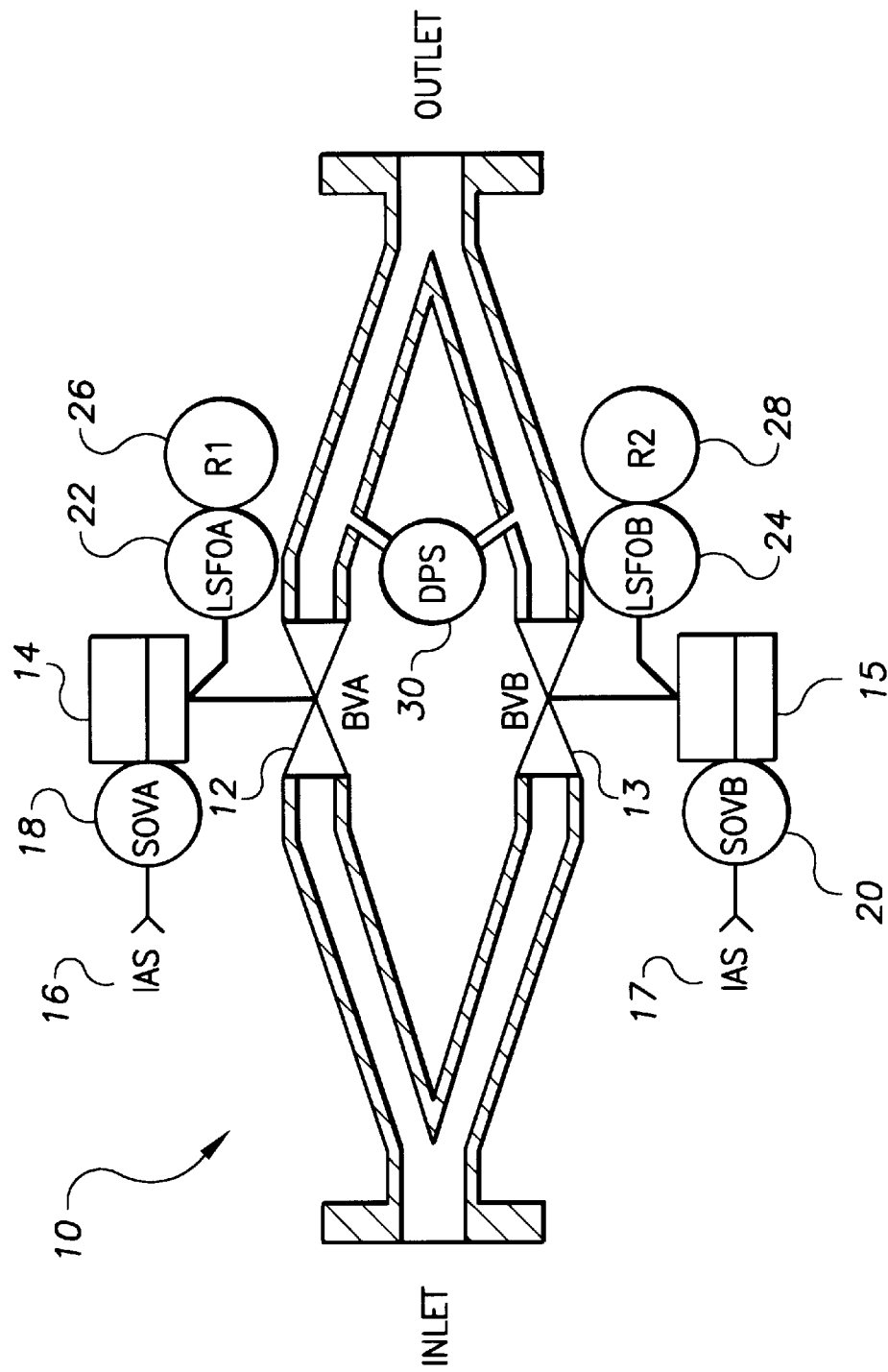
FIG. 1 is a plan view of a the self checking block valve of the instant invention.

The invention concerns a cycling continuously self checking final control element, such as a block valve, for use in critical safety shut down systems in industrial settings. Other types of valves may be used with the invention, but the most common use in an industrial setting is likely to be block valves. The preferred embodiment consists of a valve body (10), with dual valve ports and valves A and B (12 and 13, respectively). The valves may be connected in any process line in parallel, or may be a part of a single piece of piping equipment as shown in FIG. 1. Each valve port and valve (12, 13) is independently operated by a separate actuators A and B (14 and 15). Each actuator is powered by an instrument air supply (16 and 17), and is piloted by separate solenoids A and B (18 and 20). Each valve port and valve A and B has an independent "full open" detection switch A and B (22 and 24), with an associated relay R1 and R2 (26 and 28). There is a differential pressure switch (30) located at the outlet of the dual valve ports (12 and 13), but prior to the reconvergence of the two streams.

Figure 2:
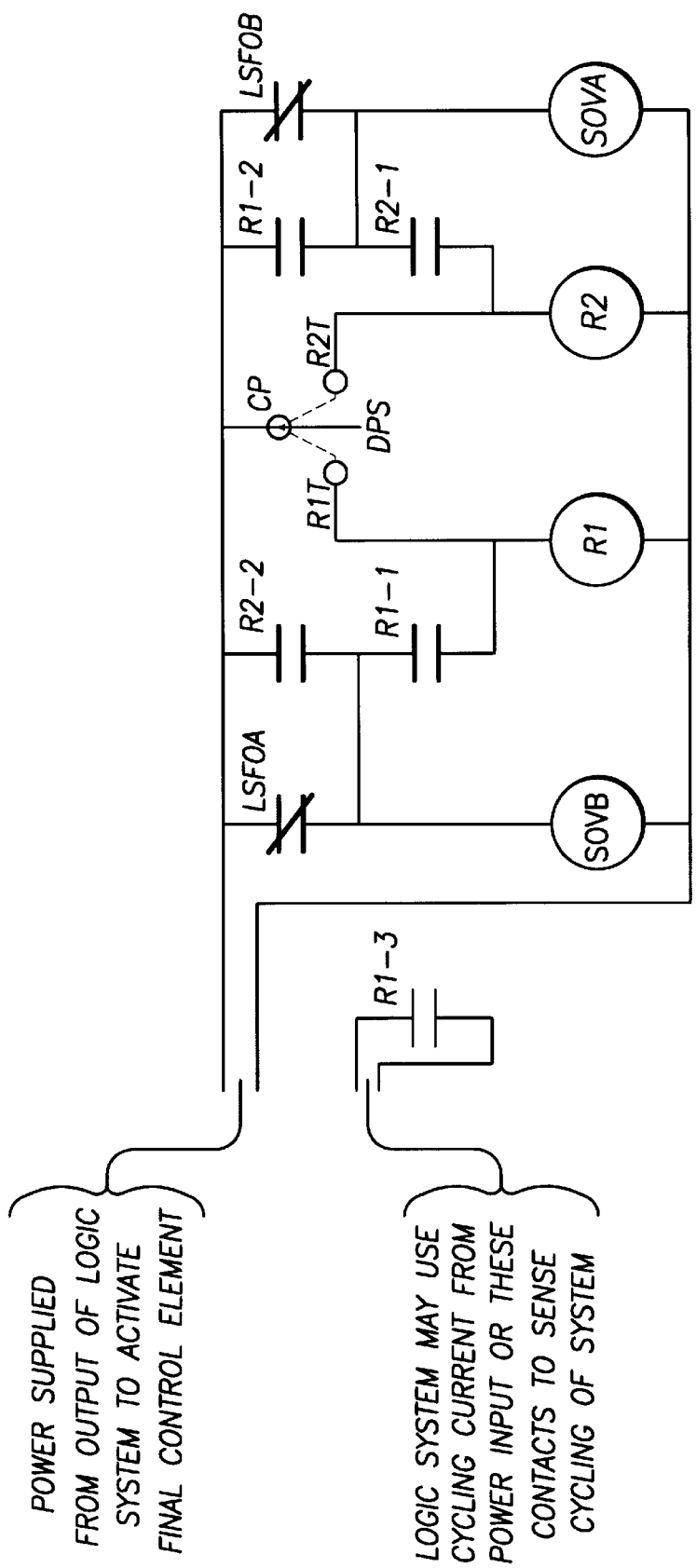
FIG. 2 is an elementary wiring diagram for the self checking block valve of the instant invention.

The converging streams at the outlet of the valve body (10) are configured in such a way that the "venturi" action, resulting from the effect of Bernoulli's Theorem when one valve is opened and the other valve is closed, will induce a differential pressure between the outlet of the opened port and the closed port. This differential pressure simultaneously proves the open condition of one valve and the closed condition of the other. The differential pressure switch (30) is arranged so that when sufficient differential pressure is sensed in either direction, its common pole will close with the "throw" being associated with one of the two relays R1 and R2 (26 and 28) depending upon the direction of the differential pressure (see FIG. 2).

In its initial state, no power is applied to the valve system from the logic output (see FIG. 2) and both valve ports and valves A and B (12 and 13) are closed. In this state, no process fluid can flow through the valve body (10). The common pole of the differential pressure switch (30) will be in the neutral position since there will be no fluid flow, and no differential pressure. Both full open limit switches A and B (22 and 24) are closed since both valve ports and valves A and B (12 and 13) are closed. The contacts of the full open limit switches A and B (22 and 24) "open" when a valve reaches its full open position. Relays R1 and R2 (26 and 28) are de-energized in this initial state. The relays R1 and R2 (26 and 28) will close their contacts immediately upon becoming energized, but have a time delay associated with de-energization. Thus, the relay contacts will remain closed for a period of time after the relay is de-energized. This time delay will depend upon the other components used in the system, but is preferably on the order of ¼ to ½ second.

When it is desired to permit the process fluid to flow, the logic system provides power to the device. At this time, since the contacts of both full open limit switches A and B (22 and 24) are closed, the solenoids A and B (18 and 20) will be energized and will supply instrument air (16, 17) to the actuators A and B (14 and 15) of both valve ports and valves A and B (12 and 13). One of the valves will reach its full open position first. Different response times between the two valves may be utilized to insure that one specific valve reaches its full open position first. The following description assumes that valve A (12) reaches its full open position first. When valve A (12) reaches its full open limit, the contacts of full open limit switch A (22) will open, and interrupt current flow to solenoid B (20), thereby forcing valve B (13) to close. With valve A (12) fully open and valve B (13) fully closed, the flow of process fluid across the outlet piping of valve port B (13) causes a reduction in pressure at the enclosed outlet of valve port B (13). This induced differential pressure causes the common pole of the differential pressure switch (30) to close to R2T, energizing the coil of relay R2 (see FIG. 2). Contacts R2-1 "latch-in" the coil of R2, through the closed contacts of full open limit switch B (24). R2 will now remain energized after the differential pressure switch (30) returns to the neutral position, and will remain energized until the contacts of full open limit switch B (24) open.

Contacts R2-2 close when R2 energizes, and provide current to solenoid B (20) bypassing the open contacts of full open limit switch A (22). Energized solenoid B (20) now provides instrument air to the actuator of valve B (13), which starts to open. As valve B (13) reaches its full open position, the contacts of full open limit switch B (24) open, de-energizing both solenoid A (18) and relay R2 (28). With solenoid A (18) de-energized, instrument air is removed and vented from actuator A (14) and valve A (12) starts to close.

As valve A (12) moves from its full open position, the contacts of full open limit switch A (22) close and provide a source of current flow to solenoid B (20) in addition to the closed contacts R2-2. The contacts R2-2 will remain closed for the de-energization time delay of relay R2 (28). With valve B (13) fully open and valve A (12) fully closed, a differential pressure in induced between the outlets of valve ports A and B which forces the common pole of the differential pressure switch (30) to close with throw R1T, energizing the coil for relay R1 (26). Relay R1 (26) will remain self latched through the closed contacts of R1-1 and full open limit switch A (22). Contacts R1-2 will energize the coil of solenoid A (18). With solenoid A (18) energized, instrument air is provided to actuator A (14), and valve A (12) starts to open. As valve A (12) reaches its full open position, the contacts of full open limit switch A (22) open, de-energizing both solenoid B (20) and relay R1 (26). With solenoid B (20) de-energized, instrument air is removed and vented from actuator B (15) of valve B (13) and it starts to close.

As valve B (13) moves from its full open position, the contacts of full open limit switch B (24) close and provide a source of current flow to solenoid A (18) in addition to the closed contacts of R1-2. The device then proceeds to repeat the opening and closing cycle of the valves A and B.

By monitoring either the cycling current drawn from the power source (the logic systems output) or the contacts R1-1, the logic system will be able to continuously monitor for the proper operation of the valves A and B. The monitored cycle will be interrupted by any of the following conditions:

Failure of the plug or stem of either valve A or B;
Failure of either solenoid A or B;
Failure of the differential pressure switch;
Blockage of the differential pressure switch sensing port;
Failure of either full open limit switch A or B;
Any failure in the wiring within the block valve system;
Any failure in the wiring between the system and the logic input or output;
Failure of the power output circuit from the logic system; and
Failure of the input circuit within the logic system.

Accordingly, the valve system of the present invention continuously checks for the proper operation of the block valve system and detects any type of failure of the system.

Devices can be added to the system to provide for the adjustment of the frequency of the opening and closing of the valves. It may be desirable for one cycle to take days or even weeks to complete. Otherwise there may be unnecessary wear and tear on the valves. Means to adjust the frequency of the cycle include placing restrictions on the air supply ports and/or vent ports of the valve actuators, installing resistive/capacitive networks in parallel with the coils of the relays to lengthen the time required for the relay to pull-in or release, including RC networks with diodes if the coil is intended to be used with alternating current power. Other means to limit the frequency of the cycle include placing a time-delay mechanism on each full open limit switch, so that a time delay would be induced whenever the switch opened or closed, or placing a microprocessor in the system, programmed to limit the cycling frequency via delaying the energization of either solenoid valve, or placing a delay mechanism on the differential pressure switch to slow its action.

It is intended that the foregoing detailed description be regarded as illustrative rather than limiting and that it is understood that the following claims including all equivalents are intended to define the scope of the invention.

What I claim is:

1. A cycling self checking valve system comprising;
   two valves, one each of said two valves located in parallel streams which are connected to a single inlet and outlet,
   means to alternately open and close said two valves and to repeat continuously the alternate opening and closing of said two valves, whereby first one of said valves closes and then reopens while the second of said valves remains open, and then the second of said valves closes and then reopens while the first of said valves remains open,
   means to recognize and monitor irregularities in the cycles of said valve opening and closings.

2. A cycling self checking valve system as in claim 1, wherein a failure of the means to alternately open and close said two valves and to repeat continuously the alternate opening and closing of said two valves will create an irregularity in the cycle of said valve opening and closings.

3. A cycling self checking valve system as in claim 1 wherein said means to recognize and monitor irregularities comprises a computer that is programmed to recognize irregularities in the cycles of said valve opening and closings.

4. A cycling self checking valve system as in claim 1 wherein said means to alternately open and close said two valves comprises,
   independently driven actuators on each of said two valves, and
   full open sensors on each of said two valves whereby it is determined when each of said two valves are fully open.

5. A cycling self checking valve system as in claim 4 wherein said means to alternately open and close said two valves further comprises a differential pressure switch that senses when there is flow through one of said valves, but not through the other of said valves.

6. A cycling self checking valve system as in claim 5 wherein signals from said differential pressure switch and said full open sensors interact to coordinate said means to alternately open and close said two valves.

7. A cycling self checking valve system as in claim 1 further comprising means to adjust the frequency of the application of said means to alternately open and close said two valves.

8. A process for continuously monitoring the operation of a valve, comprising the steps of;
   connecting two valves, one each of said two valves located in parallel streams which are connected to a single inlet and outlet,
   alternately opening and closing said two valves, whereby first one of said valves closes and then reopens while the second of said valves remains open, and then the second of said valves closes and then reopens while the first of said valves remains open,
   repeating continuously the alternate opening and closing of said two valves, and
   recognizing and monitoring irregularities in the cycles of said valve opening and closings.

9. A cycling self checking valve system comprising;
   a pipe body with single inlet and single outlet, said pipe body diverging into two streams after said single inlet and reconverging to a single stream prior to said single outlet,
   a valve in each of said two streams,
   means to alternately open and close said two valves and to repeat continuously the alternate opening and closing of said two valves, whereby first one of said valves closes and then reopens while the second of said valves remains open, and then the second of said valves closes and then reopens while the first of said valves remains open, means to recognize and monitor irregularities in the cycles of said valve opening and closings.

10. A cycling self checking valve system as in claim 9, wherein a failure of the means to alternately open and close said two valves and to repeat continuously the alternate opening and closing of said two valves will create an irregularity in the cycle of said valve opening and closings.

11. A cycling self checking valve system as in claim 9 wherein said means to recognize and monitor irregularities comprises a computer that is programmed to recognize irregularities in the cycles of said valve opening and closings.

12. A cycling self checking valve system as in claim 9 wherein said means to alternately open and close said two valves comprises, independently driven actuators on each of said two valves, and full open sensors on each of said two valves whereby it is determined when each of said two valves are fully open.

13. A cycling self checking valve system as in claim 12 wherein said means to alternately open and close said two valves further comprises a differential pressure switch that senses when there is flow through one of said valves, but not through the other of said valves.

14. A cycling self checking valve system as in claim 13 wherein signals from said differential pressure switch and said full open sensors interact to coordinate said means to alternately open and close said two valves.

15. A cycling self checking valve system as in claim 9 further comprising means to adjust the frequency of the application of said means to alternately open and close said two valves.

* * * * *